United States Patent [19]

Heemels et al.

[11] Patent Number: 5,371,676

[45] Date of Patent: Dec. 6, 1994

[54] APPARATUS AND METHOD FOR DETERMINING DATA OF COMPOUND WORDS

[75] Inventors: Robertus P. E. H. Heemels, Roermond; Eduardus J. W. van Vliembergen; Louis M. G. Cremers, both of Venlo, all of Netherlands

[73] Assignee: Oce-Nederland, B.V., Venlo, Netherlands

[21] Appl. No.: 915,602

[22] Filed: Jul. 21, 1992

[30] Foreign Application Priority Data

Jul. 23, 1991 [NL] Netherlands ............ 9101285

[51] Int. Cl.$^5$ ............................................. G06F 15/38
[52] U.S. Cl. ............................ 364/419.11; 364/419.13
[58] Field of Search .............. 364/419, 419.01, 419.02, 364/419.04, 419.07, 419.10, 419.11, 419.12

[56] References Cited

U.S. PATENT DOCUMENTS

| 4,342,085 | 7/1982 | Glickman et al. | 364/300 |
| 4,672,571 | 6/1987 | Bass et al. | 364/900 |

FOREIGN PATENT DOCUMENTS

| 0145202 | 6/1985 | European Pat. Off. . |
| 0179214 | 4/1986 | European Pat. Off. . |
| 0283685 | 9/1988 | European Pat. Off. . |

OTHER PUBLICATIONS

Foreign Search Report.

*Primary Examiner*—Roy N. Envall, Jr.
*Assistant Examiner*—Ari M. Bai
*Attorney, Agent, or Firm*—Birch, Stewart, Kolasch & Birch

[57] ABSTRACT

To determine lexical data relating to a compound target word by reference to a vocabulary containing words with their lexical data, the vocabulary is searched for a word having a longest final part in common with the target word, the vocabulary being arranged in retrograde order for the purpose of this search process.

7 Claims, 6 Drawing Sheets

APPARATUS AND METHOD FOR DETERMINING DATA OF COMPOUND WORDS

BACKGROUND OF THE INVENTION

1. Field of the Invention

The instant invention relates to an apparatus and method for handling compound words and more specifically for determining data relating to compound target words and to a data processing unit containing such an apparatus.

2. Description of the Related Art

An apparatus of the type herein under consideration is known from European patent specification EP-B-0 145 202. This disclosure describes an apparatus for selecting, for spelling checking purposes, records relevant to a compound word from a vocabulary. The vocabulary contains no compound words but only basic words, in order that the vocabulary may occupy the minimum of memory space. The basic words correspond to a keyword and give a unique identification of a record from the vocabulary. The problem underlying this system is to select, for the purpose of determining lexical data of compound words, a record relevant thereto from a vocabulary of this kind which does not contain compound words, in order to restrict, as far as possible, the memory space required for the vocabulary.

A first disadvantage of using such an apparatus is that a search action repeatedly has to be carried out on the entire vocabulary to process a compound word. A second disadvantage is that if the vocabulary contains a large number of basic words, which is desirable for practical use, there is considerable risk that the first part of a word will agree with the basic word such that it would be no longer possible to find a basic word for the remaining part of the word, and this will give rise to a repeated search action.

SUMMARY OF THE INVENTION

Therefore, it is an object of the present invention to provide a system for handling compound words which will overcome the above noted disadvantages.

It is a further object of the present invention to provide a method and apparatus for determining data relating to compound target words.

Still, a further object of the present invention is to provide a data processing unit incorporating an apparatus for manipulating data relating to compound words.

Yet, still a further object of the present invention is to provide a system for determining lexical data relating to a compound target word without including the compound target words in the vocabulary.

The foregoing objects and others are accomplished in accordance with the present invention, generally speaking, by providing an apparatus comprising a vocabulary constructed from records each containing a keyword, and selection means for selecting from the vocabulary a record relevant to the compound target word. The apparatus of the type described is characterized in that the keywords are arranged in retrograde order and the selection means are adapted to select from the vocabulary that record which has a keyword having a maximum final part in common with the target word, and a method for selecting from the vocabulary of that record that keyword having a maximum final part in common with the target word.

The present invention relies upon the fact that in many languages the lexical data of a compound word is determined by the final part of the compound word and is based on the principle that finding the record having a final word part corresponding as much as possible to the target word and hence containing the required lexical data is greatly simplified by performing the search action on a vocabulary arranged in retrograde order.

By retrograde order is meant that the keywords are in alphabetical order, starting with the last character of each word and working back to the first character. A word in the vocabulary is searched for by checking character-by-character for agreement with a keyword starting with the final character of the word and working back to the first character. The effect of this search method is that although the target word is not completely found, a keyword is found which, starting with the final character and thus working back, has the maximum number of characters in common with the target word. A keyword with the associated record found in this manner will be that keyword from the vocabulary which, reading back from the final character, most agrees with the target word. Since this latter part is the determining factor for the lexical data, the lexical data of the keyword found can be accepted.

It is apparent from the foregoing that the indicated search method is also suitable for determining the lexical data of those words which appear completely in the vocabulary. The advantage of this is that it is possible in one operation to determine the lexical data of both simple words and compound words. There is no longer any need to distinguish prior compound words from simple words, and to give the first a separate treatment, e.g. segmentation into the basic words making up the compound, in order to determine the lexical data.

One advantage of the apparatus and method of the present invention is in that selection takes place only if the maximum final part of the word exceeds a minimum length. With this criterion it is possible to avoid incorrect results because too few final characters agree. Another advantage of the method is in the determination within a search interval limited by a top limit record and a bottom limit record, an intermediate record, comparing the keyword of the intermediate record with the target word, reducing the search interval, and selecting a record when the top limit record and the bottom limit record have approached one another. A fast search method is obtained in this way.

BRIEF DESCRIPTION OF THE DRAWINGS

These advantages will be explained with reference to the following description and the accompanying drawings wherein.

DETAILED DESCRIPTION OF THE INVENTION

Figure 1:
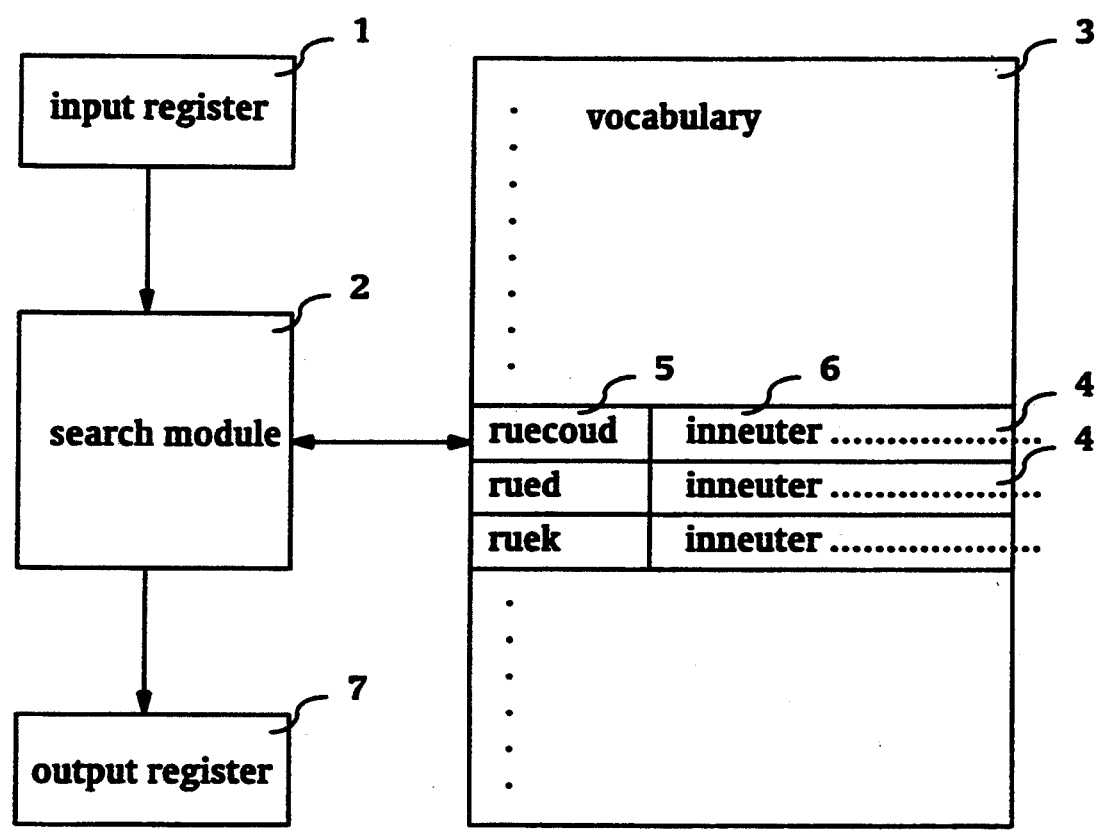
FIG. 1 is a block schematic of an apparatus according to the present invention.

Referring now to FIG. 1 there is seen a block schematic of an apparatus according to the instant invention. Such an apparatus comprises an input register 1, a search module 2, a vocabulary 3 arranged in retrograde order and an output register 7. The retrograde vocabulary 3 comprises a number of records 4. Each record contains a keyword 5 and lexical data 6 associated therewith. The retrograde order of the vocabulary is obtained by arranging the keywords in retrograde order. FIG. 1 shows a number of key-words arranged in retrograde order as an illustration. The fact that these keywords are written in inverted form is not essential to the invention. A target word present in the input register 1 is fed to the search module 2, which comprises a selection means. The search module 2 consults the retrograde vocabulary 3 and, with the aid of the selection means, determines the record relevant to the target word, whereupon the data obtained is placed in the output register 7.

Figure 2:
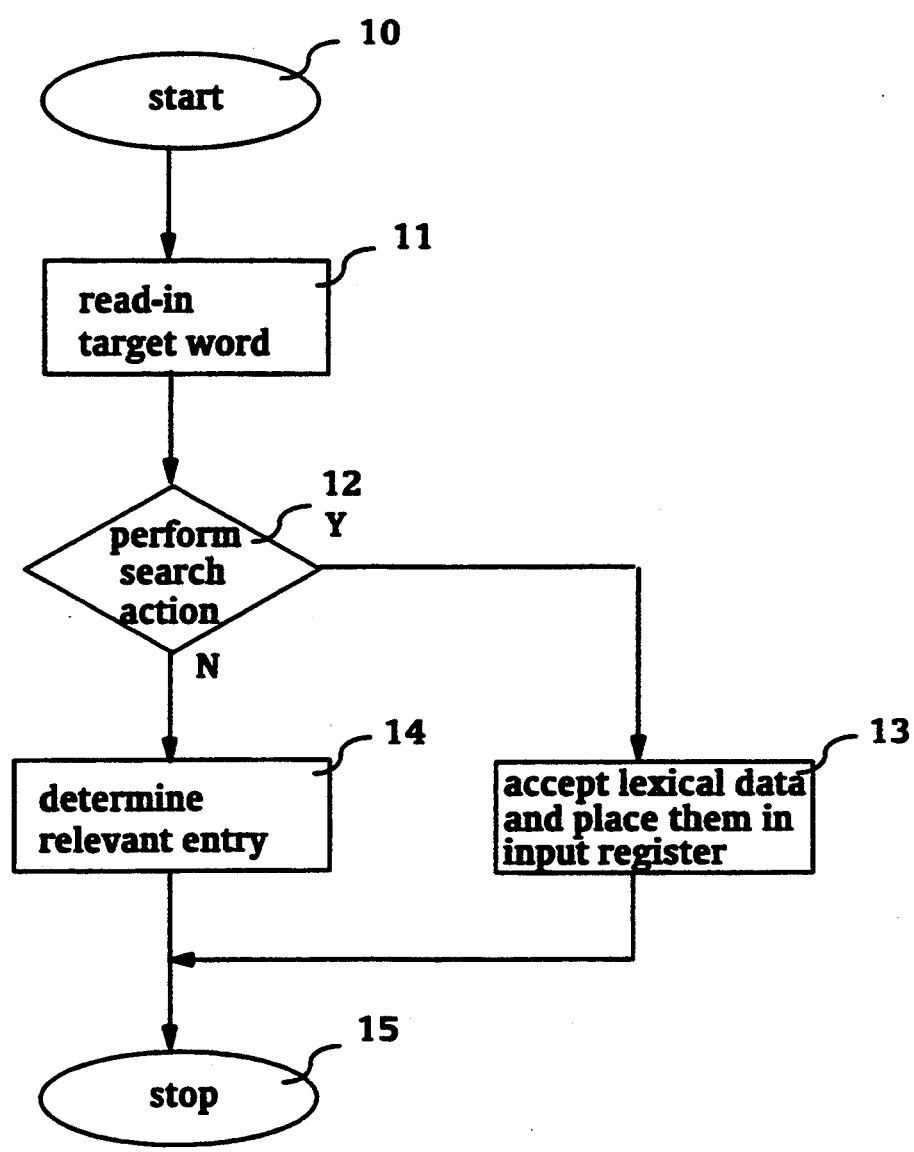
FIG. 2 is a flow diagram showing the method according to the present invention.

The method according to the invention will now be explained generally with reference to FIG. 2. The starting position is indicated by reference 10. The target word is read in at step 11. A search is then carried out in step 12 on the retrograde vocabulary by comparing the target word character-by-character with a number of keywords. Various search methods are possible here, e.g. linear traversing of the vocabulary or a binary method, in which the search interval is reduced stepwise. One advantageous variant of the binary search method will be explained in FIG. 3. If in step 12 it is found that the target word is completely contained in the vocabulary (Y), then in step 13 the lexical data is accepted and placed in the output register. If it is found in step 12 that the target word is not contained in the vocabulary (N), then in step 14 a relevant entry for the target word is determined and the lexical data thereof placed in the output register. The final condition 15 is reached after this.

Figure 3A:
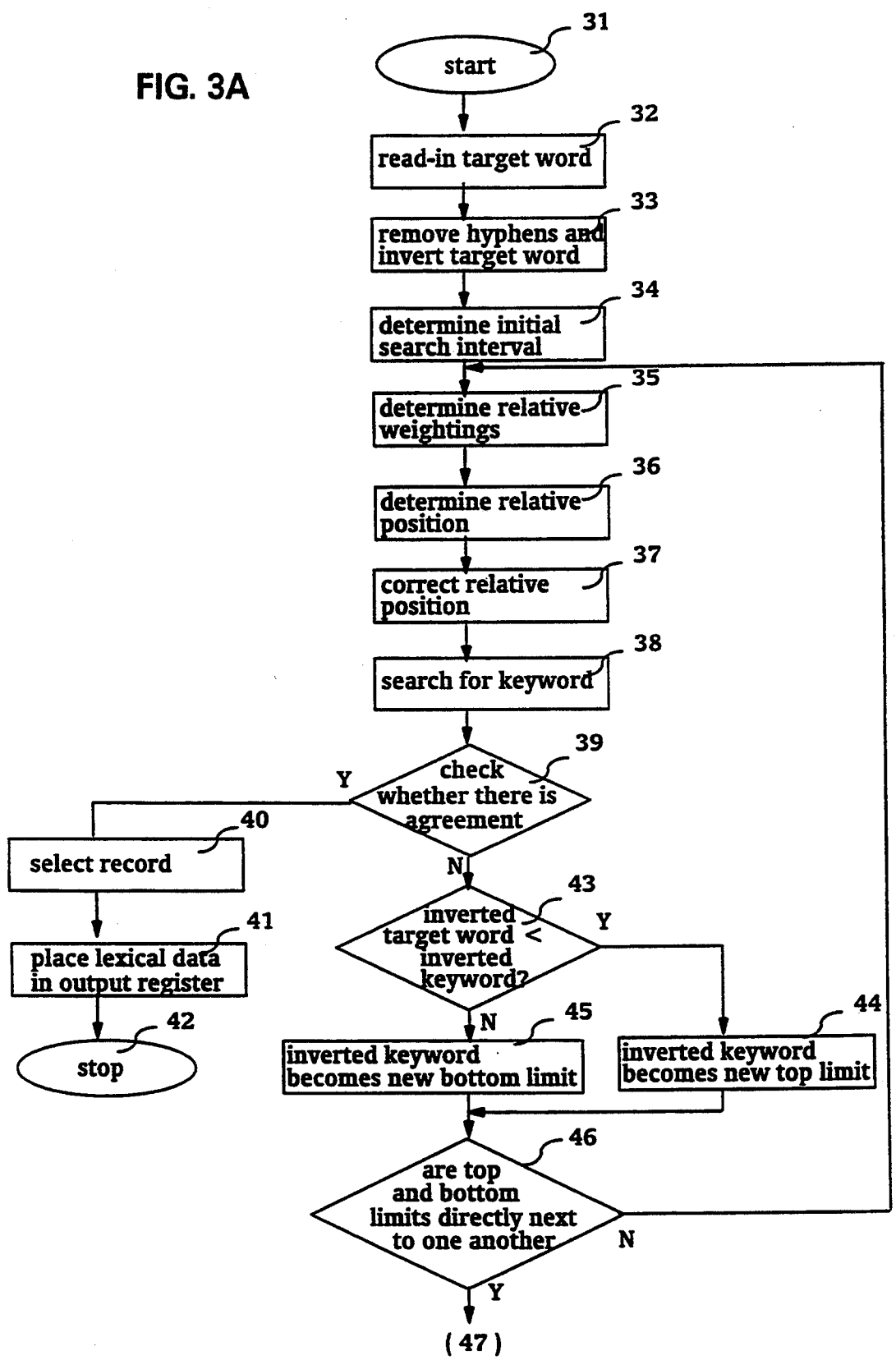
FIG.3A-3B is a flow diagram relating to one embodiment of the method according to the present invention.
Figure 3B:
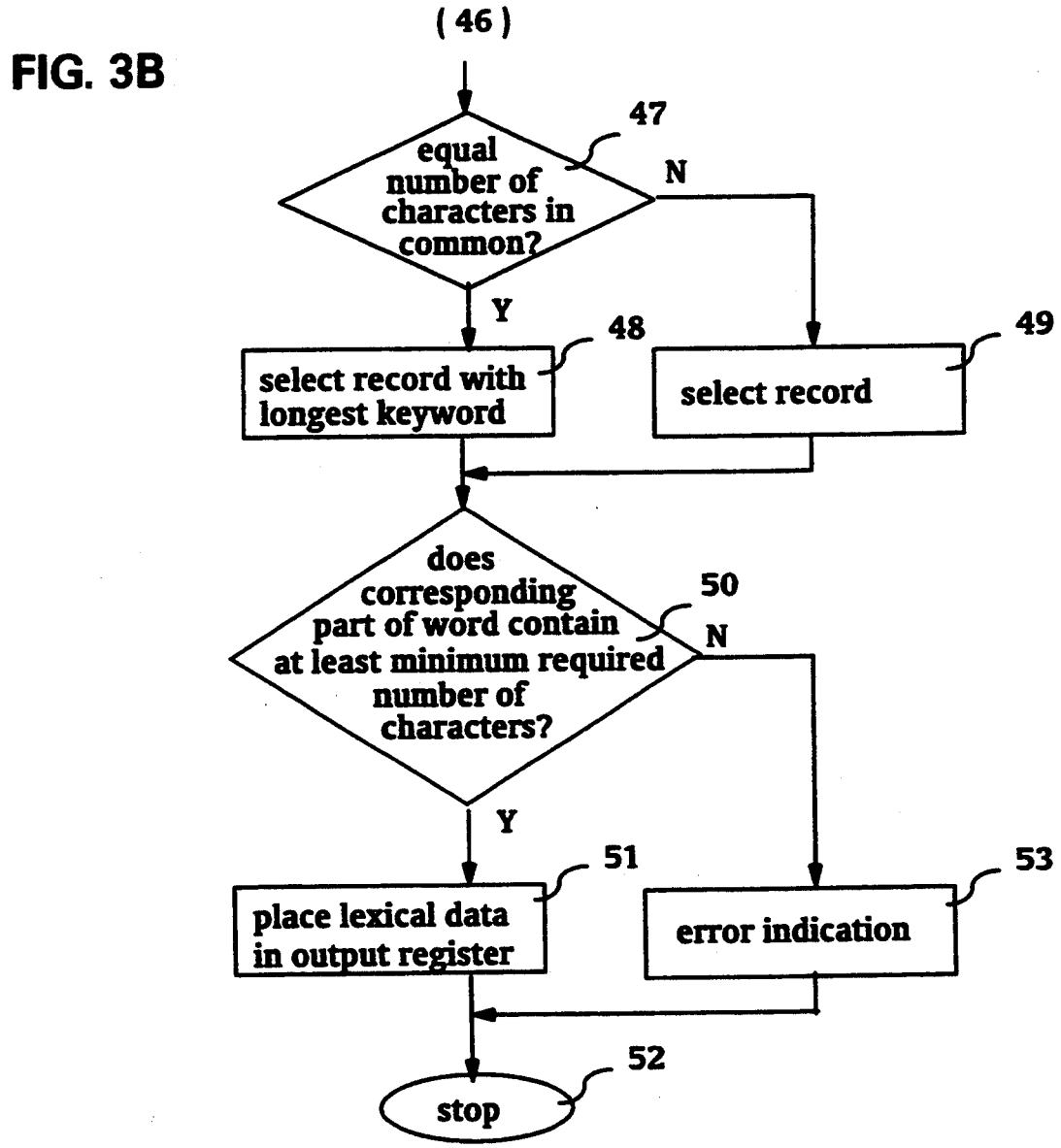

One advantageous embodiment of the method according to the invention will now be explained in detail with reference to FIG. 3A-3B. The starting situation is denoted by reference 31. The target word is read in at step 32, whereupon any hyphens in the target word are removed in step 33 and the target word is inverted. However, the latter is not necessary to the principle of the invention. The search method now to be described is a variant of the binary search method known from the literature, in which a search interval is reduced stepwise. The search interval is defined by a top limit record and a bottom limit record. In step 34 an initial search interval is determined in the vocabulary by defining the top limit record and the bottom limit record. It is possible to use the first and last records of the vocabulary for this purpose. It is more advantageous to provide the vocabulary with an index on each record, of which the combination of the first two characters of the keyword differs from that of the previous record. The initial search interval is then determined by the first two characters of the target word. The bottom limit is determined by the first record of which the inverted keyword starts with this combination of the two characters, and the top limit is determined by the last record of which the inverted keyword begins with the combination of the two characters. If an initial search interval has been determined, then the relative weights of the inverted keywords associated with the top and bottom limits, and of the inverted target word, are determined in step 35. A check is first made as to how many characters correspond from the start of the three inverted words. Of each inverted word the first and second characters are taken directly positioned after the mutually corresponding characters. The relative weights are then determined by determining, as to each of the three words, the sum of the number associated with the first character, directly positioned after the mutually corresponding characters, multiplied by 27 and the number associated with the second character positioned after the corresponding characters. The number associated with a character is its order number in the alphabet. Other methods of allocating numbers to characters are, of course, possible. In step 36 the relative position of the inverted target word on the interval is determined by taking the quotient of the difference in relative weights of the inverted target word and the bottom limit and the difference in relative weights of the top limit and bottom limit. Since the weights calculated in this way will not be distributed uniformly over the interval, this relative position is corrected in step 37 by placing it closer to the middle of the interval. In step 38 the keyword is then searched for which occurs at the calculated position in the vocabulary, whereupon step 39 determines whether there is agreement between the key-word searched for and the target word. If there is complete agreement (Y), then this record is selected in step 40 and the lexical data of the selected record placed in the output register in step 41, thus reaching the final condition 42. If there is no complete agreement in step 39 (N), step 43 checks whether the inverted target word is smaller than the inverted key-word on the basis of the alphabetical word order. If this is so (Y), then in step 44 the required inverted keyword becomes the new top limit of the search interval. If this is not the case (N), then in step 45 the required inverted keyword becomes the new bottom limit of the search interval. Step 46 checks whether the top and bottom limits of the search interval are situated directly next to one another. If this is not the case (N), the program returns to step 35. If it is the case (Y), the search action stops in the vocabulary. Step 47 then determines whether the corresponding first part of the inverted target word and the inverted keyword associated with the bottom limit is of a length identical to the corresponding first part of the inverted target word and the inverted keyword associated with the top limit. If this is the case (Y), step 48 selects from the top and bottom limits found, the record having the longest keyword. If this is not the case (N), step 49 selects the record of which the inverted key-word has a longest first part in common with the inverted target word. In both cases, a check is then carried out in step 50 as to whether the corresponding part of the word contains at least a minimum required number of characters. If this is the case (Y), then in step 51 the lexical data together with a marker indicating that the word is not fully contained in the vocabulary are placed in the output register, whereafter the final condition 52 is reached. If this is not the case, an error indication is given in step 53, whereafter the final condition 52 is reached.

EXAMPLES

The above-described method will now be explained in detail with reference to the following examples. Example 1

The first example will relate to the Dutch language. The input word is the Dutch compound word for church door 'kerkdeur'. It is assumed that the relevant segment of the vocabulary in which the inverted keywords start with the two-character combination 'ru' contains the words indicated in Table 1 below. Starting from the start situation 31, the target word 'kerkdeur' is read in at step 32. This is a compound word. It is not contained in the vocabulary. In step 33 the target word is inverted and yields 'ruedkrek'. In step 34 the top and bottom limits of the initial search interval are determined. This is defined by the first two characters of the inverted target word 'ru'.

TABLE 1

List of Inverted Keywords
    ruatnec (initial bottom limit)
    ruecuod
    rued
    ruek
    ruekfa
    ruekroov
    ruel
    ruez
    ruu
    ruug
    ruuhcs
    ruum
    ruup
    ruuv (initial top limit)

The initial search interval has the top and bottom limits 'ruuv' and 'ruatnec', respectively. The relative weights of the words are then calculated in step 35. For this purpose, the program first determines from which position the words differ from one another. This is from the second position. The weight is thus calculated on the basis of the third and fourth characters. The number given to a character corresponds to the order number in the alphabet. The number given to the third character is multiplied by 27. This yields the following:

| ru | at | nec | -> | 27 * 1 + 20 = | 47 |
| ru | ed | krek | -> | 27 * 5 + 4 = | 139 |
| ru | uv |  | -> | 27 * 21 + 22 = | 589 |

In step 36 the relative position xr of the inverted target word on the interval is then calculated by standardizing the distance between the bottom limit and the target word on the size of the interval:

$$xr = \frac{139 - 47}{589 - 47} = 0.17$$

In step 37 this relative position is then corrected for the non-uniform distribution of the weights of the words over the interval. This yields xrc, which is calculated by shifting the position in the direction of the middle of the interval 'xh'. the extend of the shift is determined by the correction factor c. This is taken as being 0.4. This yields:

$$xrc = xr*(1-c) + xh*c = 0.3$$

The absolute position on the interval then becomes xa=int(0.3*N)=4, where N is the number of records in the interval and int() is a function which rounds off a number to form a complete value. The keyword associated with the calculated position is then searched for in the vocabulary in step 38. This yields 'ruek', whereupon step 39 checks whether this word agrees with the target word. This is not the case (N), so that in step 43 a check is made whether the inverted target word is smaller, according to the alphabetical order, than the inverted keyword. This is the case (Y), so that in step 44 the keyword found is made the top limit. In step 46 a check is then carried out as to whether the bottom and top limits are next to one another. This is not the case (N), so that the program returns to step 35, where the relative weights are recalculated:

| ru | at | nec | -> | 27 * 1 + 20 = | 47 |
| ru | ed | krek | -> | 27 * 5 + 4 = | 139 |
| ru | ek |  | -> | 27 * 5 + 11 = | 146 |

In step 36 the relative position on the new interval is then determined:

$$xr = \frac{139 - 47}{146 - 47} = 0.93$$

Correction is then carried out in step 37 for the non-uniform distribution and the absolute position 'xa' on the interval is determined to be xa=3. In step 38 the keyword of the third record is then determined: 'rued'. In step 39 it is then established that there is no agreement with the target word (N), so that the method proceeds with step 43. This step verifies that 'ruedkrek' is larger, by alphabetic word order, then 'rued' (N). In step 45 'rued' is made the bottom limit. Step 46 checks whether the bottom and top limits are situated next to one another. This is the case (Y), so that the program passes to step 47 where a check is made whether the inverted keywords associated with the top and bottom limits have an equal number of characters in common with the inverted target word. This is not the case (N), so that in step 49 that record is selected whose inverted keyword has most characters in agreement with the inverted target words. This yields 'rued'. Step 50 checks whether the agreeing part of the word contains at least the minimum number of required characters. Let it be assumed that this is 4. The record found then satisfies this condition (Y). The lexical data for the inverted keyword 'rued' is as follows: 'inneuter male female sing3'. This data is retrieved and then in step 51 placed in the output register in the following form:

(kerkdeur (noun (*rued inneuter male female sing3))).

The marker "*" indicates that the target word does not completely appear in the vocabulary. The final condition 52 is then reached.

Example 2

Now an example for the English language will be given. The input word is the compound word 'bookkeeper'. It is assumed that the relevant segment of the vocabulary in which the inverted keywords start with the two-character combination 're' contains the words indicated in the following Table 2.

TABLE 2

List Of Inverted Keywords
    rep (initial bottom limit)

repac
repeed
repeek
repeels
repeep
repeerc
repeews
repel
repmac
repmub
reppu
repous (initial top limit)

Starting from the start situation 31, the target word 'bookkeeper' is read in at step 32. This is a compound word, and it is not contained in the vocabulary. In step 33 the target word in inverted and yields 'repeekkoob'. In step 34 the top and bottom limits of the initial search interval are determined. This is defined by the first two characters of the inverted target word 're'.

The initial search interval has the top and bottom limits 'repuos' and 'rep', respectively. The relative weights of the words are then calculated in step 35. For this purpose, the program first determines from which position the words differ from one another. This is from the third position. The weight is thus calculated on the basis of the fourth and fifth characters. The number given to a character corresponds to the order number in the alphabet. The number given to the fourth character is multiplied by 27. This yields the following:

```
rep |              ->  27 * 0 +  0 =   0
rep | ee | kkoob   ->  27 * 5 +  5 = 140
rep | uo | s       ->  27 * 21 + 15 = 582
```

In step 36 the relative position 'xr' of the inverted target word in the interval is then calculated by standardizing the distance between the bottom limit and the target word on the size of the interval:

$$xr = \frac{140 - 0}{582 - 0} = 0.25$$

In step 37 this relative position is then corrected for the non-uniform distribution of the weights of the words over the interval. This yields xrc, which is calculated by shifting the opposition in the direction of the middle of the interval 'xh'. The extent of this shift is determined by the correction factor c. This is taken as being 0.4. This yields:

$$xrc = xr*(1-c) + xh*c = 0.35$$

The absolute position on the interval then becomes xa=int(0.35*N)=5, where N is the number of records in the interval and int() is a function which rounds off a number to form an integer value.

The keyword associated with the calculated position is then searched for in the vocabulary in step 38. This yields 'sleeper', whereupon step 39 checks whether this word agrees with the target word. This is not the case (N), so that in step 43 a check is made whether the inverted target word is smaller, according to the alphabetical order, than the inverted keyword. This is the case (Y), so that in step 44 the keyword found is made the top limit. In step 46 a check is then carried out as to whether the bottom and top limits are next to one another. This is not the case (N), so that the program returns to step 35, where the relative weights are re-calculated:

```
rep |              ->  27 * 0 + 0 =   0
rep | ee | kkoob   ->  27 * 5 + 5 = 140
rep | ee | ls      ->  27 * 5 + 5 = 140
```

In step 36 the relative position on the new interval is then determined:

$$xr = \frac{140 - 0}{140 - 0} = 1$$

Correction is then carried out in step 37 for the nonuniform distribution and the absolute position 'xa' on the interval is determined xa=4. In step 38 the keyword of the fourth record is then determined 'repeek'. In step 39 it is then established that there is no agreement with the target word (N), so that the method proceeds with step 43. This step verifies that 'repeekkoob' is larger, by alphabetic word order, then 'repeek' (N). In step 45 'repeek' is made the bottom limit. Step 46 checks whether the bottom and top limits are situated next to one another. This is the case (Y), so that the program passes to step 47 where a check is made whether the inverted keywords associated with the top and bottom limits have an equal number of characters in common with the inverted target word. This is not the case (N), so that in step 49 that record is selected whose inverted keyword has most characters in agreement with the inverted target word. This yields 'repeek'. Step 50 checks whether the agreeing part of the word contains at least the minimum number of required characters. Let it be assumed that this is 4. The record found then satisfies this condition (Y). The lexical data for the inverted keyword 'repeek' is as follows: 'countable sing3 noun'. This data is retrieved and then in step 51 placed in the output register in the following form:
(bookkeeper(noun(*repeek countable sing3 noun))).

The marker indicates that the target word does not completely appear in the vocabulary. The final condition 52 is then reached.

The invention is advantageously applied to all cases where it is necessary to find in a vocabulary a word which has a final part in common with the target word.

Figure 4:
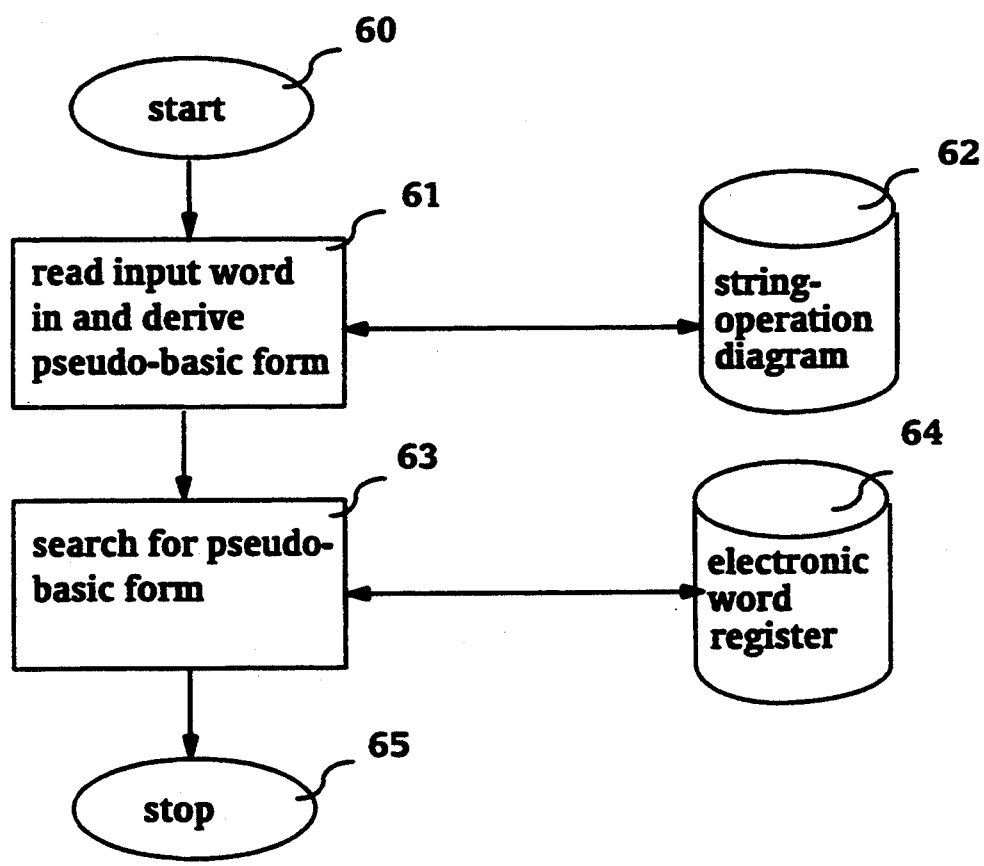
FIG. 4 is a flow diagram of a method for lexicalizing an input word, in which the method of the present invention can advantageously be applied.

The invention is further advantageously combined with the method described in patent application NL 91 01284 (filed by Applicants on the same date as the Dutch priority application of the present case was filed) for obtaining lexical data. This is explained in detail with reference to FIG. 4 and the associated steps. Starting from the starting situation denoted by reference 60, the input word is read in at step 61 and a pseudo-basic form associated with the input word is derived by reference to a string operation diagram 62. In step 63 this pseudo-basic form is searched for in an electronic word register 64 and, if found, the lexical data are determined and written out, whereafter the final condition 65 is reached.

The invention can advantageously be used to search for the pseudo-basic form in the electronic word register. To this end, the electronic word register 64 is constructed as a vocabulary arranged in retrograde order and the search method according to the invention is applied. This procedure has the effect that the lexical data can also be determined for compound inflected words, it only being necessary to include in the vocabulary for consultation simple noninflected words, thus giving a considerable reduction of memory space occupied by the vocabulary. The marker added to the lexical data indicates that the word is not contained in that form in the vocabulary and that there is only agreement with a word in the vocabulary as regards the final part of the word, and this could also indicate that the word is incorrectly spelled in the remaining part of the word.

It is advantageous to include a number of compound words in the vocabulary. In this way the required minimum number of corresponding characters of the final part of the word can be increased, thus reducing the risk of incorrect results.

Figure 5:
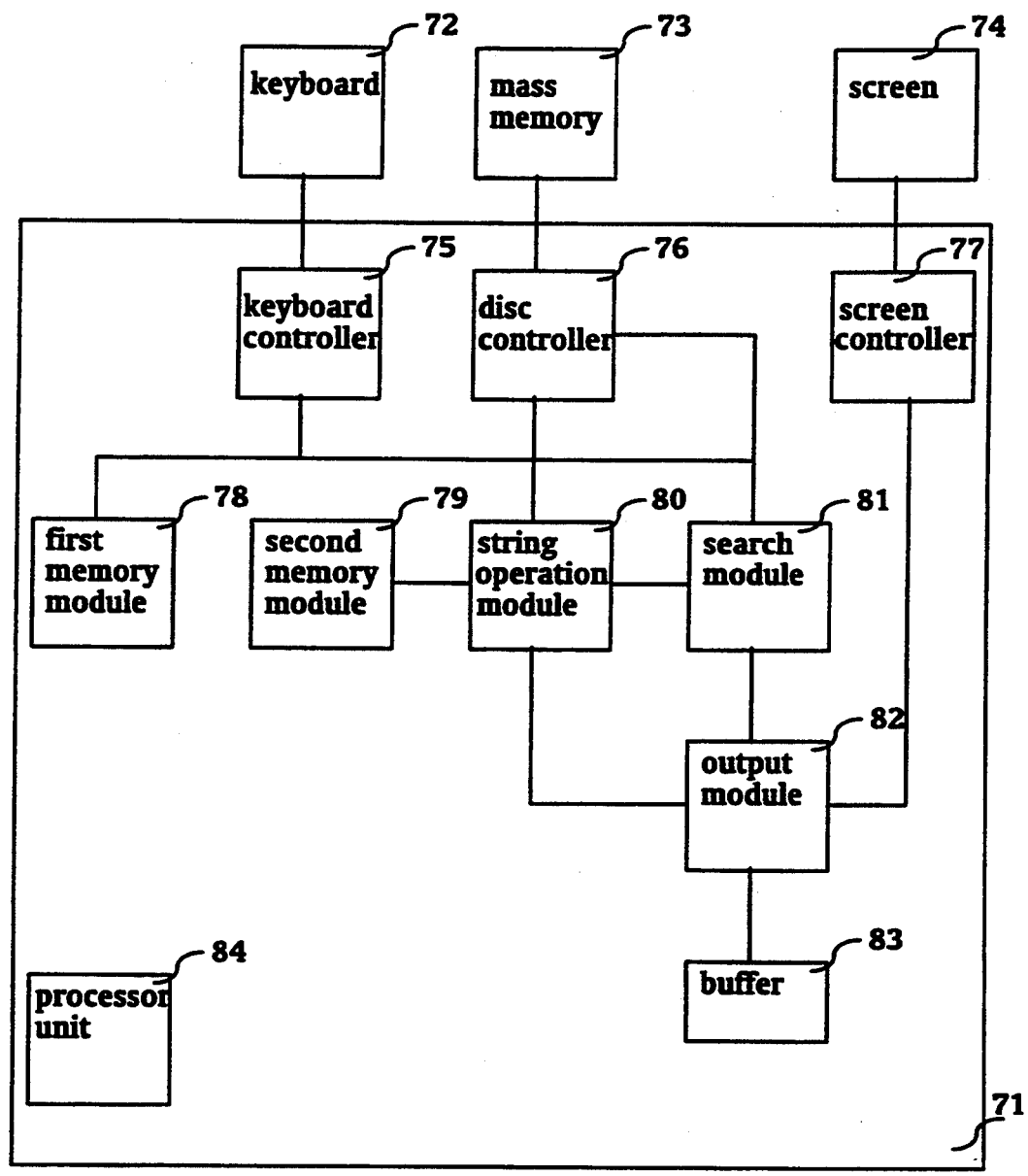
FIG. 5 is one possible embodiment of a data processing unit provided with an apparatus according to the present invention and adapted to the lexicalization of both compound words and simple words.

FIG. 5 shows one possible embodiment of a data processing unit provided with an apparatus according to the invention and adapted to the lexicalization of both compound words and simple words. The data processing unit comprises a main unit 71, provided with a keyboard 72, a mass memory 73 in which the vocabulary arranged in retrograde order in accordance with the invention is stored, and a screen 74. The main unit 71 comprises a keyboard controller 75 connected to the keyboard 72, a disc controller 76 connected to the mass memory 73, a screen controller 77 connected to the screen 74, a first memory module 78 which can be loaded with text files from the mass memory, a second memory module 79 in which the string operation diagram and the associated instruction series are stored, a string operation module 80 containing means for processing an input word by reference to the string operation diagram, and means for selecting an instruction series associated with the path traversed through the string operation diagram, and a search module 81 containing means for checking whether a pseudo-basic form found has an entry in the list of basic forms. To this end, this search module contains the selection means according to the invention and is adapted to select from the vocabulary that record which contains a keyword having a maximum final part in common with the target word. The main unit also comprises an output module 82 which contains means for checking whether an entry found satisfies the instruction series and means for adapting the data from the entry, a buffer 83 in which the data obtained is placed, whereupon the data is available for further processing, and a processor unit 84 which controls all of the modules and controllers.

An input word originating from a text file stored in the first memory module 78 or input via the keyboard 72 is fed to the string operation module 80. By reference to the string operation diagram stored in the second memory module 79, the string operation module 80 generates a pseudo-basic form and an associated instruction series. The pseudo-basic form obtained is fed to search module 81, which checks whether the pseudo-basic form has an entry in the list of basic forms stored in the mass memory 73, and for this purpose performs the steps of the method according to the invention, whereafter, if an entry is found, the data thereof is read in. This data is fed to the output module 82 which compares the data with the instruction series supplied by the string operation module 80 and also processes the data to form the data characteristic of the input word. The characteristic data obtained is displayed on the screen 74 via screen controller 77 or else placed in the buffer memory 83, whereafter the data can be used for other purposes, e.g. for parsing sentences.

The invention is not limited to the method or embodiments described, but can be put into practice by the skilled artisan in various other ways, all of which however are intended to come within the scope of the claims.

What is claimed is:

1. Apparatus for determining data relating to a compound target word, comprising a vocabulary in memory constructed from records each containing a keyword, and a data processing unit provided with a selection means for selecting from said vocabulary a record relevant to said compound target word, characterized in that said keywords are arranged in retrograde order and said selection means are adapted to select from said vocabulary that record which has a keyword having a maximum final part in common with said target word.

2. An apparatus according to claim 1, wherein said selection means is adapted such that said selection takes place by said selection means only if the maximum final part of said word exceeds a minimum length.

3. A computerized method for determining data relating to a compound word, comprising providing a vocabulary in memory constructed from records each containing a keyword, the keywords being arranged in retrograde order, and processor means for selecting from said vocabulary a record relevant to said compound word, said record having a keyword having a maximum final part in common with said compound word.

4. A computerized method according to claim 3, wherein said record selection from said vocabulary takes place only if said maximum final part in common with said compound word exceeds a minimum length.

5. A computerized method according to claims 3 or 4, characterized by determining, within a search interval defined by a top limit record and a bottom limit record, an intermediate record, comparing the keyword of said intermediate record with the compound word, reducing the search interval, and selecting a record when the top limit record and the bottom limit record have approached one another.

6. A computerized method according to claim 5, characterized in that if the lengths of the common parts of the word associated with the adjacent top limit record and bottom limit record are identical, the record having the longest keyword is selected.

7. An apparatus according to claim 1, said data processing unit thereof further comprising a means for obtaining lexical data relating to a target word and being adapted to lexicalize both compound words and simple words.

* * * * *